United States Patent [19]

Nicholas et al.

[11] Patent Number: 4,549,061
[45] Date of Patent: Oct. 22, 1985

[54] ELECTRICAL DISCHARGE MACHINING APPARATUS FOR PRODUCING THREADED HOLES

[76] Inventors: Leo P. Nicholas, 2290 Nixon, Howell, Mich. 48843; Robert J. Nicholas, 32242 Barkley, Livonia, Mich. 48154

[21] Appl. No.: 472,373

[22] Filed: Mar. 4, 1983

Related U.S. Application Data

[63] Continuation of Ser. No. 213,051, Dec. 15, 1980, abandoned.

[51] Int. Cl.[4] .............................. B23P 1/08; B23P 1/14
[52] U.S. Cl. ................................. 219/69 G; 219/69 E
[58] Field of Search ................. 219/69 V, 69 E, 69 R, 219/69 G, 68

[56] References Cited

U.S. PATENT DOCUMENTS

| | | | |
|---|---|---|---|
| 2,650,979 | 9/1953 | Teubner | 219/69 V |
| 2,773,968 | 12/1956 | Martellotti et al. | 219/69 V |
| 3,072,777 | 1/1963 | McKechnie | 219/69 V |
| 3,588,196 | 6/1971 | Bonga et al. | 219/69 G |
| 3,657,507 | 4/1972 | McNeece | 219/69 G |
| 3,761,771 | 10/1973 | Roy | 219/69 V |

*Primary Examiner*—M. H. Paschall
*Attorney, Agent, or Firm*—Cullen, Sloman, Cantor, Grauer, Scott & Rutherford

[57] ABSTRACT

A device adapted for use with electrical discharge machining apparatus generates tapped holes in a workpiece using a threaded, hollow carbon tool. The tool is releasably connected to a reversible hydraulic motor by a coupling which feeds dielectric fluid through the interior of the tool into the space between the machining tip of the tool and the workpiece. The motor is mounted on a vertically reciprocable slide arrangement carried by a support which is mounted on the head of the conventional electrical discharge machine. The tool extends downwardly through a threaded guide which is held in spaced relationship to the workpiece by the support, thereby allowing fluid emanating from the tip of the tool to carry machined fragments upwardly out of the tapped hole. The slide includes a slide plate mounted on a pair of upright guide posts carried by the support. The weight of the slide plate and the motor apply constant downward pressure on the tool, thereby precisely controlling the spacing between the tool tip and the workpiece, even during motor reversal. A plurality of aligning elements removably mounted on the support allow rapid set-up and alignment of the tool relative to the workpiece.

20 Claims, 7 Drawing Figures

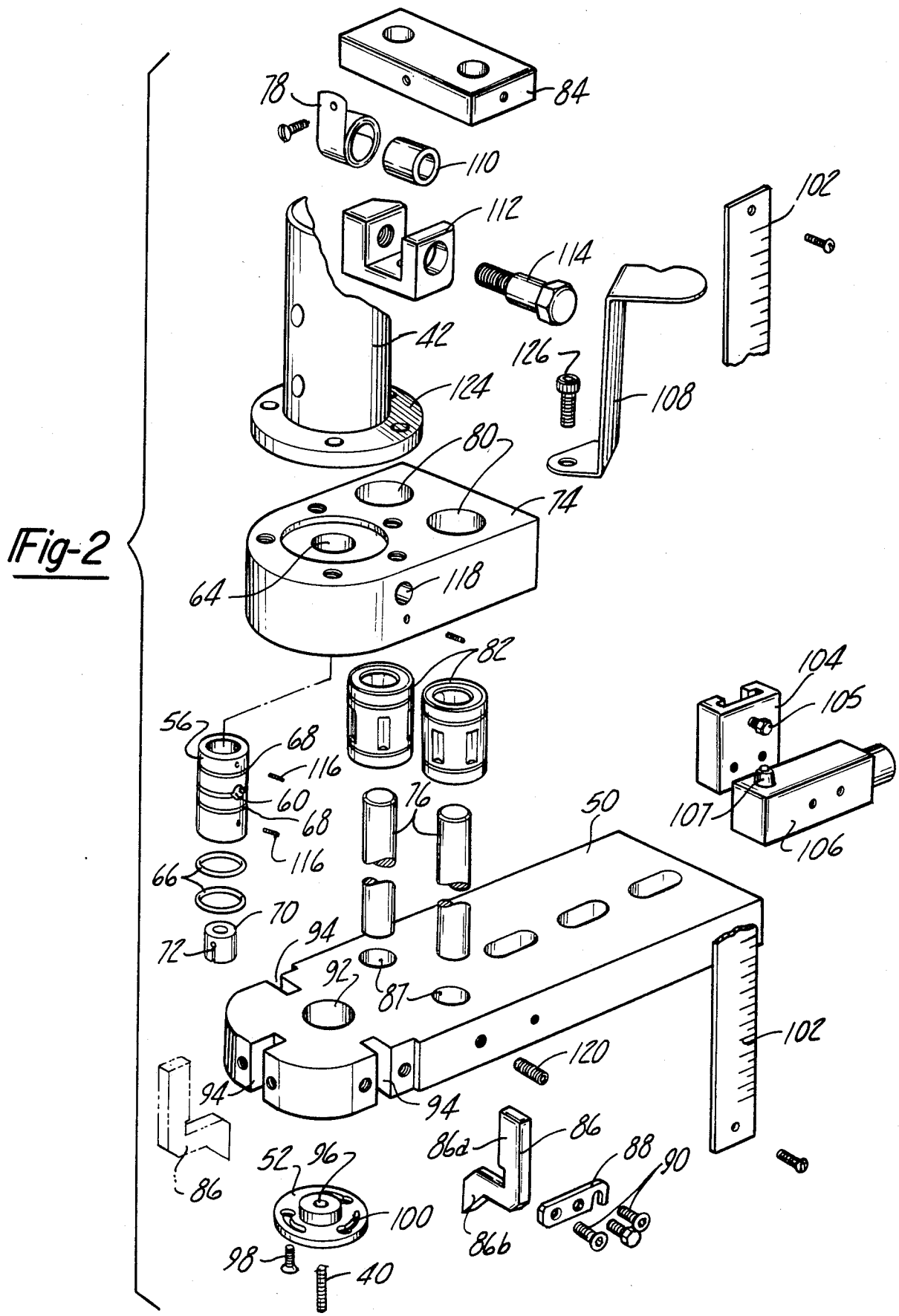

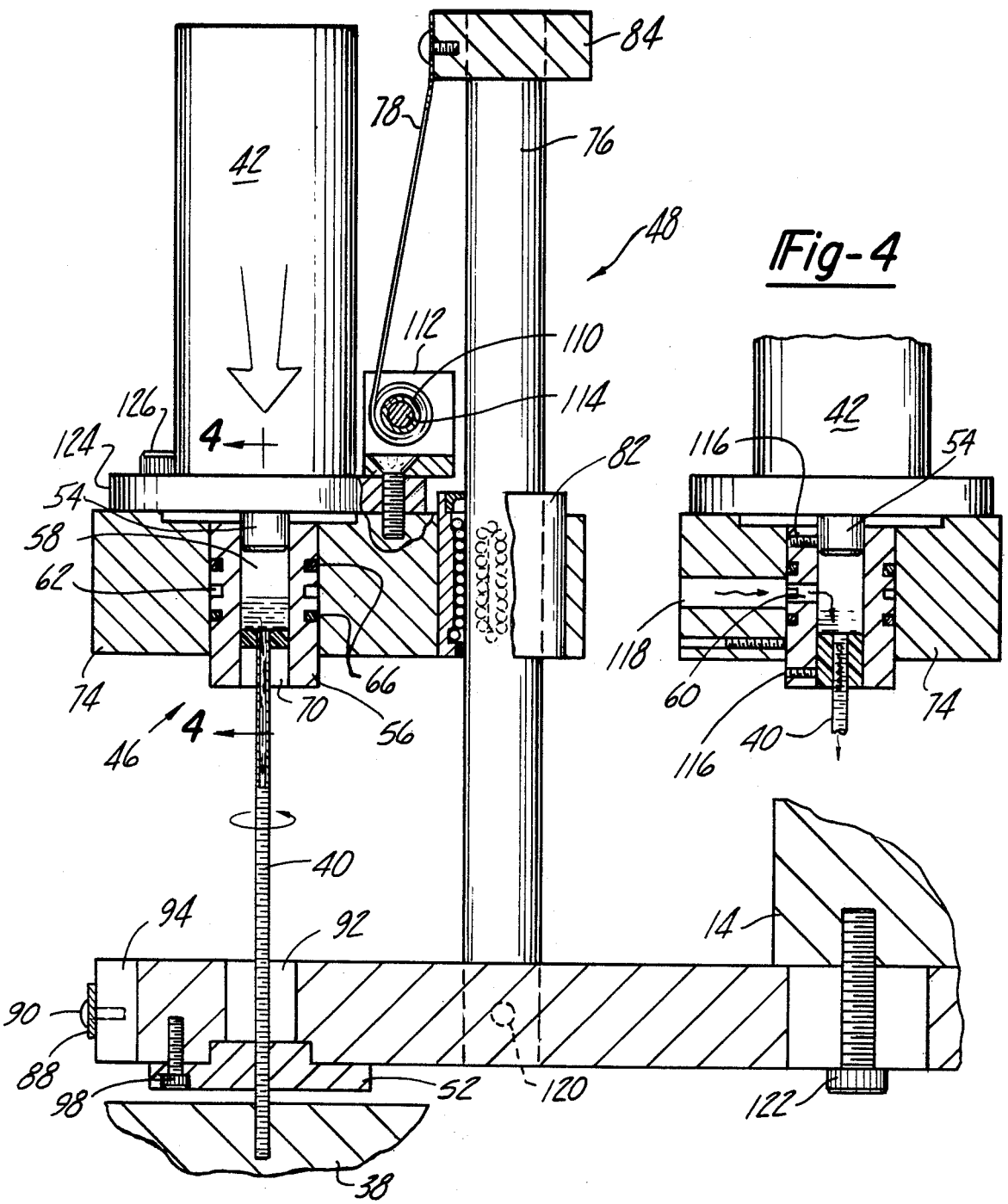

ELECTRICAL DISCHARGE MACHINING APPARATUS FOR PRODUCING THREADED HOLES

This application is a continuation of application Ser. No. 213,051, filed Dec. 15, 1980, now abandoned.

TECHNICAL FIELD

This invention generally relates to electrical discharge machines, and deals more particularly with a device adapted for use with a conventional electrical discharge machine for producing tapped holes in a workpiece.

BACKGROUND ART

The use of electrical discharge machining apparatus for producing tapped holes in a workpiece is well known in the art. EDM's (electrical discharge machines) are commonly employed for this purpose where the workpiece comprises high strength, very hard steel or other electrically conductive material.

The electrical discharge machining process is based on the principle of erosion of the metal workpiece by spark discharges. The spark is a transient electrical discharge through the space between two charged electrodes, which are the tool and the workpiece. The discharge occurs when the potential difference between the tool and the workpiece is large enough to cause a breakdown in the dielectric fluid (usually oil) in which the workpiece and the tool are immersed, and to procure the electrically conductive spark channel. The breakdown potential is establshed by connecting the two electrodes to the terminal of a capacitor charged from a power source. The spacing between the tool and the workpiece is critical. Consequently, the feed rate sometimes is controlled by several mechanisms. The dielectric fluid in which the spark gap between the workpiece and the tool is immersed provides the additional function of cooling the area surrounding the spark gap and carrying away machined particles produced by the discharge.

The rate of metal removal depends on several variables, including the average current in the discharge circuit, the electrode characteristics and the nature of the dielectric fluid. Removal rate also depends on the frequency of arcing which often occurs between the electrodes when the electrodes are drawn too close together; during an arcing condition, material removal becomes unpredictable and the workpiece may become overheated or pitted. Consequently, in the event of an arc between the electrodes, it becomes necessary to increase the spacing between the electrodes; this is normally accomplished by reversing the travel of the tool until the arc is terminated following which the tool is again advanced toward the workpiece at a prescribed rate.

One known prior art device for producing tapped holes in a workpiece consists of a hand-operated assembly in which the tool, which is provided with a thread from thereon, is advanced by a hand-operated wheel. Naturally, it is extremely difficult for a human to advance the tool at a constant, controlled rate of speed. Moreover, a considerable amount of time is required for the operator to detect an arcing condition and reverse the direction of the tool. Consequently, these hand-operated devices are not only inefficient in terms of the time required to tap a particular hole in a workpiece, but also result in an inferior quality thread in the tapped hole.

Other types of mechanisms employed for producing tapped holes utilized hydraulically-operated servo-control mechanisms and a hydraulic motor for rotating and advancing the tool. Typically, the hydraulic motor is mounted directly on the vertically shiftable machining hand and the workpiece is positioned on a bed or table immediately beneath the head. The head is then lowered at a prescribed rate while the hydraulic motor turns the tool. A lead thread positioned at the side of the tool advances at the same rate as the tool, thereby to provide the operator with an indication of the feed rate. The tool is guided toward a preselected location on the workpiece by means of a threaded guide or pilot which is directly secured to the workpiece itself.

The device described immediately above is less than completely satisfactory for several reasons. First, the threaded guide surrounds the hole being tapped and therefore substantially impedes the escape of fluid flowing through the tool into the electrode gap which carries away machined particles. Another problem related to this prior device involves the fact that a certain amount of tolerance exists between the male threads of the tool and the female threads of the threaded guide; when the motor is reversed to eliminate an arcing condition, the threads shift relative to each other to one end of the tolerance range, thus altering the electrode spacing by the degree of shift. However, when the arcing condition ceases and the motor is once again reversed to advance the tool, the threads shift again to the other range of the tolerance range thereby closing the gap between the electrodes more than intended.

It is therefore a primary object of the prevent invention to overcome each of the deficiencies inherent in prior art devices of the type discussed above.

DISCLOSURE OF THE INVENTION

According to the present invention, a device adapted for use with a conventional electrical discharge machining apparatus machines tapped holes in a workpiece using a hollow, threaded carbon tool. The tool is releasably connected to a reversible hydraulic motor by a coupling which feeds dielectric fluid through the interior of the tool into the gap between the machining tip of the tool and the workpiece. The motor is mounted on a vertically reciprocable slide arrangement carried by a support which is mounted on the head of the EDM. The tool extends downwardly through a threaded guide which is held in spaced relationship to the workpiece by a support, thereby allowing fluid emanating from the tip of the tool to carry machined particles upwardly and completely out of the tapped hole. The slide includes a slide plate mounted on a pair of upright guide posts carried by the support. The weight of the slide plate and the motor apply constant downward pressure on the tool, thereby preventing longitudinal shifting of the threads of the tool and the guide relative to each other; accordingly, the spacing between the tool tip and the workpiece is closedly controlled, even during reversal of the tool rotating motor. A plurality of aligning elements removably mounted on the support allow rapid set-up and alignment of the tool relative to the workpiece.

BRIEF DESCRIPTION OF THE DRAWINGS

In the drawings, which form an integral part of the specification and are to be read in conjunction there-with, and in which like reference numerals are employed to designate identical components in the various views:

FIG. 2 is an exploded, perspective view of the apparatus of the present invention shown in FIG. 1;

FIG. 3 is a fragmentary, front view of a portion of the machine shown in FIG. 1, parts being broken away in section for clarity;

FIG. 4 is a sectional view taken along the line 4—4 in FIG. 3;

BEST MODE FOR CARRYING OUT THE INVENTION

Figure 1:
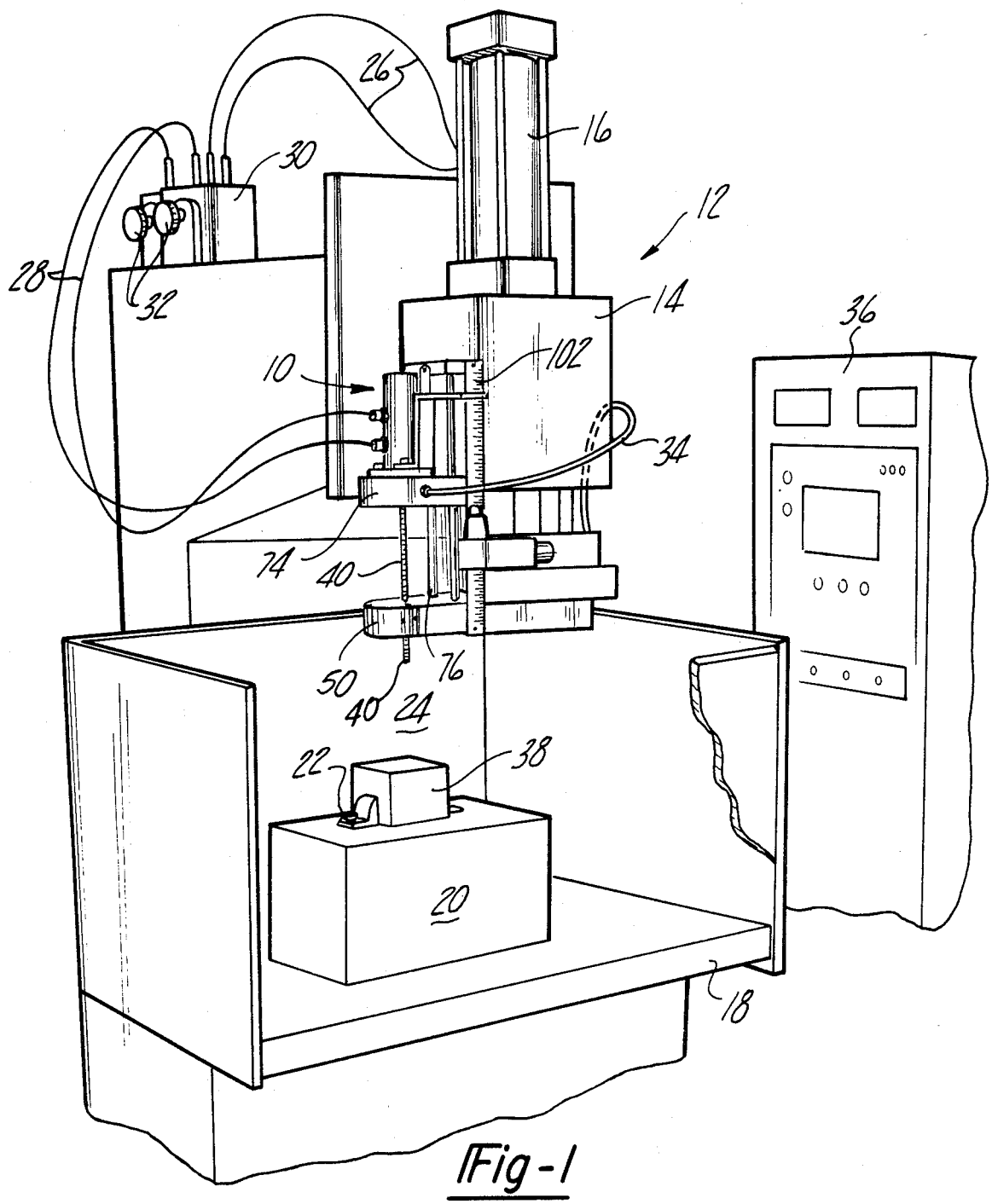
FIG. 1 is a perspective view of an electrical discharge machine having the apparatus of the present invention installed thereon, one wall of the dielectric container being broken away to reveal the position of the workpiece to be machined.
Figure 5:
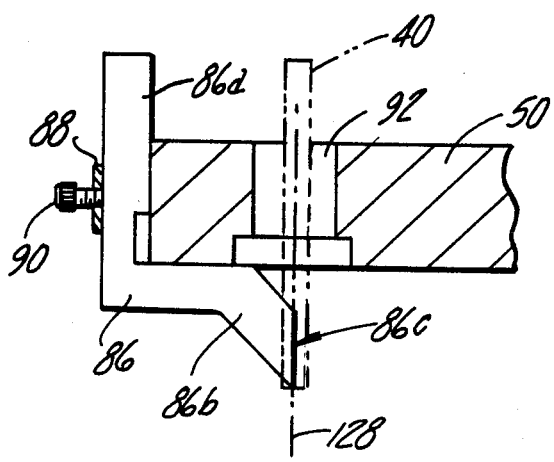
FIG. 5 is a fragmentary, sectional view of a portion of the support, showing an alignment element mounted thereon.
Figure 6:
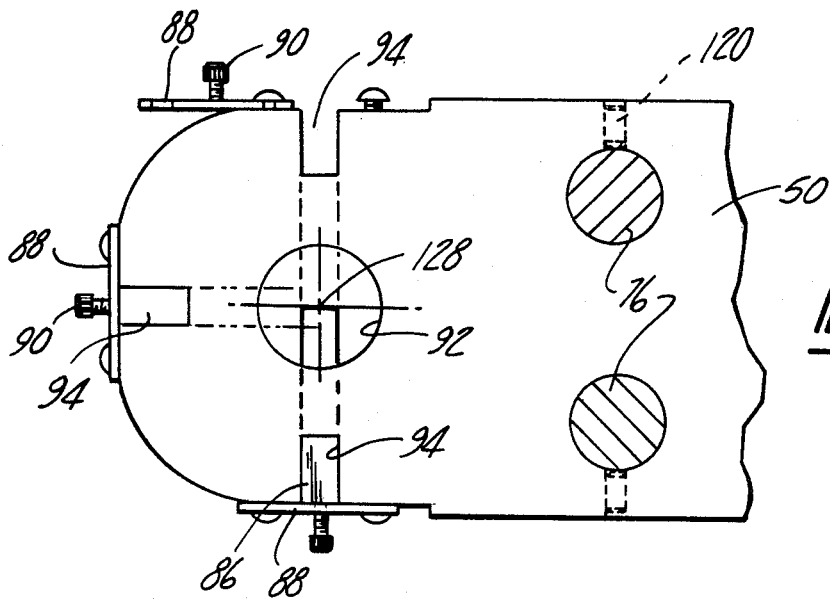
FIG. 6 is a fragmentary plan view of the support and depicting one of the alignment elements fixing the position of the longitudinal axis of the tool; and, FIG. 7 is a side elevational view of a portable electrical discharge machine employing the apparatus of the present invention.

Referring first to FIG. 1, the present invention broadly relates to apparatus, generally indicated by the numeral 10 adapted for use as an attachment for an electrical discharge machine 12. The machine 12 includes a head 14 reciprocably mounted on a vertical support 16 and adapted to have any of the various types of machining fixtures mounted thereon. Vertical shifting of the head 14 is normally controlled by a hydraulic control system which includes hydraulic supply lines 26. Machine 12 is further provided with a bed 18 disposed beneath the head 14 upon which there is mounted a support block 20 for supporting a workpiece 38. Workpiece 38 may be stationarily held on block 20 by means of hold-down clamps 22. The entire bed 18 is surrounded by sidewalls defining a fluid tight container 24. A suitable source of dielectric fluid is connected to a fluid inlet (not shown) of the container 24 so as to immerse the workpiece 38 in the dielectric fluid during the machining process.

A control system 36 includes a suitable source of D.C. power, the outputs of which are respectively connected to the apparatus 10 and the workpiece 38 via the bed 18 and block 20. Control system 38 further includes suitable hydraulic controls for controlling the movement of the head 14 on the support 16. The apparatus 10 includes a pair of hydraulic input lines 28 which are coupled to a hydraulic bypass assembly 30. Bypass assembly 30 is also connected to lines 26 as well as a suitable source of pressurized, hydraulic fluid and is controlled by means of hydraulic valves 32 to alternately place the fluid in communication with either lines 26 or 28.

Referring now also to FIGS. 2–6, the apparatus 10 broadly comprises a hydraulic motor 42 for rotating a tapping tool 40 and mounted by slide means generally indicated at 48 on a support plate 50. The motor includes an annular flange 142 which is mounted by screws 126 on slide plate 74. One extremity of support plate 50 is secured with screws 124 to the head 14 of machine 12 and is provided with an aperture 92 therethrough vertically aligned with the longitudinal axis 128 of tapping tool 40.

A circularly-shaped threaded guide member 52 is matingly received in a countersunk portion of aperture 92, on the bottom side of the support plate 50 and is secured to the support plate 50 by means of screws extending through slots 100. The guide member 52 includes a threaded hole 96 longitudinally therethrough, the thread form of which is adapted to threadably receive tapping tool 40 therein. Support plate 50 maintains the bottom face of the guide member 52 in spaced relationship above the surface of the workpiece 38, as best seen in FIG. 3.

In order to locate the precise position on the workpiece 38 where the threaded hole is to be machined, three alignment elements 86 are removably mounted at spaced locations around the perimeter of the support plate 50, adjacent the aperture 92. The alignment elements 86 each comprise an upright leg 86A slidably received within corresponding notches 94 of the support plate 50, as well as an offset portion 86B extending downwardly from the support plate 50 and inwardly toward longitudinal axis 128. Alignment elements 86 terminate at their lower extremities in a vertically extending face 86C, each of which define one coordinate plane of the point of intersection of the longitudinal axis 128 with the workpiece 38. Alignment elements 86 are removably mounted on the support plate 50 by means of a retainer plate 88 and corresponding screws 90.

Slide means 48 broadly comprises a pair of spaced apart guide members in the nature of upright posts 76 which extend parallel to the longitudinal axis 128 of tapping tool 40 and are secured at their lower extremities within mounting bores 87 by means of set screws 120. Slide means 48 further comprises the previously mentioned slide plate 74 which is mounted for sliding movement on posts 76 by means of ball bearing bushings 82 secured within mounting holes 80 of slide plate 74. Bushings 82 are preferably of the type manufactured by Thompson Industries of Manhasset, New York which employ oblong circuits of bearing balls, each of which has the balls of one of its straight sides in bearing contact with the corresponding post 76; these bushings reduce sliding friction to an absolute minimum and yet maintain the alignment of the tapping tool 40 relative to the workpiece 38 within extremely close tolerances.

Motor 42 has an output shaft 54 which extends through a cylindrically-shaped bore 64 of slide plate 74 and is coupled with the upper extremity of tool 40 by means of a cylindrical connecting member 56 and a connecting element 70. Output shaft 54 is therefore connected in direct drive, one-to-one relationship to tool 40 so that the tool 40 responds without delay to the rotation of output shaft 54. Connecting member 56 may be of steel, or other rigid material, and is provided with a longitudinal passageway 58 therein, which communicates with a radially extending passageway 60 in medial regions thereof. Output shaft 54 is received with the upper regions of passageway 58 and is secured therewithin by means of set screw 116, as shown in FIG. 4. Connecting element 70 is preferably made of semi-rigid, resilient material such as plastic and is provided with an aperture longitudinally therethrough adapted to closely receive the upper extremity of tool 40 therein. Connecting element 70 includes a bifurcated portion 72 and has the upper end thereof closely received within the lower regions of the passageway 58 of connecting member 56.

Connecting element 70 is releasably held within the connecting member 56 by means of set screw 116.

Connecting member 56 is provided with a circumferentially extending, fluid directing groove 62 which communicates with passageway 60, as well as a pair of circumferential grooves 68 on opposite sides of grooves 62, within which there is seated suitable O-rings 66 for creating a fluid tight seal between connecting member 56 and the interior sidewalls of the bore 64 in slide plate 74. Slide plate 74 is also provided with a fluid inlet 118 in one side thereof which continuously communicates with the fluid directing grooves 62, even during rotation of connecting member 56, and is coupled with a suitable source of dielectric fluid via supply line 34.

Tapping tool 40 comprises electrically conductive material, such as carbon, and consists essentially of an elongate, cylindrical tube, open on both ends and provided with a suitable thread form thereon corresponding to the thread form to be machined in the workpiece 38.

A stop member 84 extends between the posts 76 and is secured near their upper ends to limit the upward travel of the slide plate 74. Biasing means comprising a flat spiral spring 78 is coupled between the stop 84 and upper surface of slide plate 74 by means of a U-shaped bracket 112 suitably fastened on the slide plate 74. Spring 78 is coiled on a spool 110 which is rotatably mounted on the bracket 112 by means of a bolt 114. One end of spring 78 is secured to spool 110, while the opposite end thereof is secured to stop 84. Thus, it may be readily appreciated that the force of gravity tending to urge the assembly of the motor 42 and slide plate 74 downwardly toward the workpiece 38 is at least partially offset by a vertically directed force produced by the tension of the spring 78.

The limit of downward travel of the slide plate 74, and thus of the tapping tool 40, may be controlled by means of a contact switch 106 mounted on a guide 104, which in turn is slidably mounted on a vertically extending, graduated guide plate 102, the opposite extremities of which are respectively secured to stop member 84 and support 50. The vertical position of guide 104 and switch 106 may be adjusted by means of a screw 105 which releases the guide 104 for sliding movement on plate 102. An L-shaped actuator 108 is secured on one side of slide plate 74, in vertical alignment with the actuating contact 107 of switch 106, thereby to engage and actuate the switch 106 when the tapping tool 40 has reached the desired depth in the workpiece 38.

Figure 7:
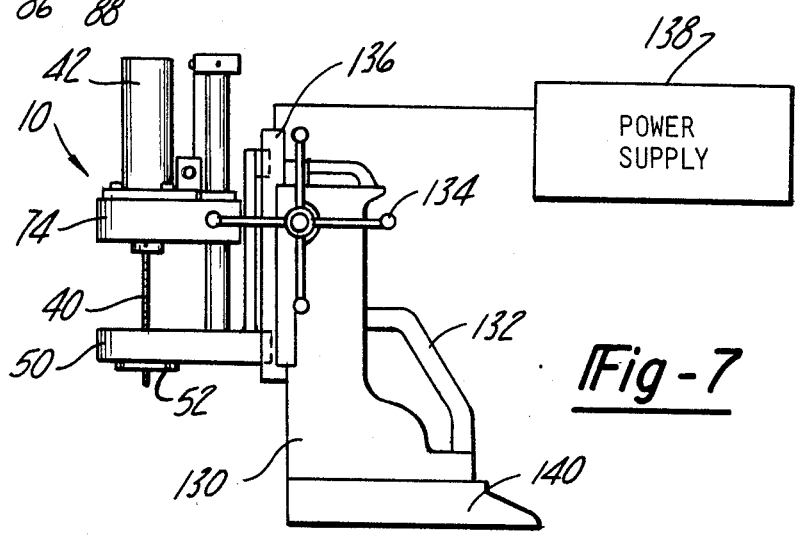

Attention is now also directed to FIG. 7 wherein the apparatus 10 is shown mounted on a portable base 130 in order to allow the apparatus to be rapidly and conveniently mounted directly on a workpiece. The base 130 may include a handle 132 to allow the apparatus to be hand-carried and may be provided with an electromagnet 140 adjacent the lower end thereof in order to permit the apparatus to be rigidly mounted in virtually any attitude on the workpiece. Apparatus 10 is mounted in a manner similar to that previously discussed on the head 136 which is reciprocably connected to the base 130. The vertical position of head 136, and thus that of the apparatus 10, is controlled by a spoked wheel 134. A suitable source of D.C. power 138, which may or may not be mounted directly on the base 130, is coupled to the apparatus 10, as well as to the workpiece to be machined.

INDUSTRIAL APPLICABILITY

The machining apparatus of the present invention is well adapted for machining threaded holes in all sizes of workpieces which are of relatively hard material. As is apparent from FIGS. 1–4, the apparatus 10 may be used in combinatiion with a conventional electrical discharge machine, but as shown in FIG. 7, the apparatus 10 is also readily adaptable for use where portability is required, as for example where the workpiece is far too large to be machined on a conventional EDM.

When mounted on a conventional EDM, as shown in FIG. 1, the first step in operating the apparatus 10 consists of moving the head 14 to a height such that the lower entering end of the tapping tool 40 is relatively close to the workpiece 38, i.e., within the stroke of the apparatus 10. Valves 32 are then operated to divert the hydraulic fluid supply of the machine 12 from lines 26 to lines 26. Next, the guide 104 and switch 106 assembly are vertically positioned on the plate 102 in order to define the depth of the hole to be tapped. The appropriate current settings and feed rates are set via the control system 36, and all further operations are then automatically carried out by the control system 36. It may be readily appreciated that the combined weight of the motor 42 and slide plate 74 present a constant, rather substantial downwardly directed pressure on the tapping tool 40. This downward pressure is transmitted to the thread form defined within guide member 52. A portion of this downwardly directed force imposed on the threads of guide member 52 is relieved by the tension force produced by spring 78 in order to prevent damage to the threads of either the tapping tool 40 or guide member 52.

In any event, by virtue of the constant, downwardly directed force imposed on the threads of guide member 52, an extremely even, controlled feed rate is achieved, since even when arcing conditions are encountered, reversal of the motor 42 results in a precise, repeatable upward displacement of tool 42 which is uneffected by axial tolerance between the threads of the tool 40 and guide member 52. Feed rate precision is further assured by the low friction mounting of the slide plate 74 on the posts 76; this mounting arrangement also assures that alignment between the tool 40 and workpiece 38 is maintained throughout the machining operation. Dielectric fluid received via line 34 enters inlet 118 in the slide plate 74 and flows into the fluid directing groove 62, which in turn directs the fluid into passageways 60 and 58. A reservoir of fluid is normally maintained within passageway 58 during operation of the apparatus. Fluid within passageway 58 is drawn by gravity downwardly through the interior of tool 40 and outwardly from the lower end of the tool 40 into the gap between the tool 40 and the workpiece 38 within the hole being machined. Fluid accumulating within the machined hole flows upwardly out of the hole and into the space between the workpiece 38 and the lower face of guide member 52, thereby quickly escaping and carrying away machined particles from the tapped hole.

When the tool 40 reaches the desired depth, actuator 108 engages contact 107 and control system 36 reverses the rotational direction of the tool 40, thereby withdrawing the tool 40 from the workpiece 38. The tapping tool 40 may be replaced by other tools having different thread forms merely by releasing the set screw 116 and replacing the tool 40. During tool change, the guide member 52 must also be interchanged with another guide member suitable for accommodating the next tool.

From the foregoing, it is apparent that the apparatus described above not only provides for the reliable accomplishment of the objects of the invention, but does so in a particularly economical and reliable manner. It is recognized, of course, that those skilled in the art may make various modifications or additions to the preferred embodiment chosen to illustrate the invention without departing from the spirit and scope of the present contribution to the art. Accordingly, it is to be understood that the protection sought and to be afforded hereby should be deemed to extend to the subject matter and all equivalents thereof fairly within the scope of the invention.

What is claimed is:

1. For use with an electrical discharge machine of the type including an electrical power source, a source of dielectric fluid and an electrically conductive, elongate electrode having a threadform thereon, apparatus for machining a threaded hole at a preselected location in a workpiece, comprising:
   motor means for rotating said electrode in either of two rotational directions;
   means for drivingly connecting said motor means with said electrode;
   means slideably mounting said motor means and said electrode for elevational movement together toward and away from said workpiece, said mounting means providing free sliding elevational movement of said motor means and said electrode toward and away from said workpiece during and throughout machining of said workpiece; and
   means for guiding said electrode; during said free sliding elevational movement of said motor means and said electrode, said guiding means including a threaded aperture threadably receiving said electrode therein, the weight of said motor means normally biasing said electrode downwardly toward said workpiece and into engagement with said guiding means during and throughout machining of said workpiece.

2. The apparatus of claim 1, wherein said mounting means includes an elongate guide adapted to be secured on said machine and structure mounted for freely sliding movement on said guide, said motor means being secured to said structure, the weight of said motor means biasing said structure to slide downwardly on said guide toward said workpiece.

3. The apparatus of claim 1, wherein said guide includes a pair of spaced apart rails and said structure includes a plate slideably mounted on said rail.

4. The apparatus of claim 1, wherein said motor means is hydraulically operated.

5. For use with an electrical discharge machine of the type including an electrical power source, a source of dielectric fluid and an electrically conductive, elongate electrode having a threadform defined thereon, apparatus for producing a threaded hole in a workpiece, comprising:
   a motor having an output shaft rotatable in either of two rotational directions;
   means for drivingly connecting said output shaft with said electrode;
   means for guiding the movement of said electrode along its longitudinal axis, said guiding means including a threaded aperture for threadably receiving said electrode therein, the threads of said aperture and said electrode having tolerances therebetween to permit slight longitudinal shifting of said electrode relative to said guiding means; and
   means for mounting said motor, said connecting means and said electrode for free sliding elevational movement together toward said workpiece during and throughout machining of said workpiece, the threads of said electrode being constantly biased in one longitudinal direction into engagement with the threads of said aperture as a result of the free sliding movement of said motor and the weight of said motor.

6. The apparatus of claim 5, wherein said motor is hydraulically driven.

7. The apparatus of claim 6, including a spring connected with said mounting means for relieving a portion of the biasing influence produced by the weight of said motor.

8. The apparatus of claim 5, wherein said mounting means includes a pair of elongate, spaced apart guides secured on said machine and a slide member slideably mounted on said guides, said motor being mounted on said slide member.

9. Electrical discharge machining apparatus for machining a threaded hole in a workpiece, comprising:
   an elongate electrode having a threadform defined thereon and adapted to be coupled with a source of electrical power;
   a motor for rotating said electrode in either of two rotational directions;
   means for drivingly connecting said electrode with said motor;
   threaded guide means threadably receiving said electrode for guiding the advance of said electrode toward said workpiece; and
   means for constantly biasing the threads of said electrode in one direction against the threads of said guide means during the advance and retreat of said electrode relative to said workpiece, said biasing means including means for mounting the combination of said motor means, said connecting means and said electrode for free sliding movement toward and away from said workpiece during and throughout machining of said workpiece.

10. The apparatus of claim 7, wherein said mounting means includes:
    an elongate guide, and
    a slide member slideably mounted on said guide,
    said motor being mounted on said slide member, the weight of said motor causing said slide member to slide downwardly toward said workpiece.

11. The apparatus of claim 9, wherein said motor is hydraulically driven and said connecting means connects said electrode in direct drive relationship to said motor.

12. For use with an electrical discharge machine of the type including a source of electrical power, a source of dielectric fluid and an electrically conductive, elongate electrode having a threadform defined thereon, apparatus for machining a threaded hole in a workpiece comprising:
   motor means for rotating said electrode in either of two rotational directions;
   threaded guide means between said motor and said workpiece for guiding and limiting the advance of said electrode, said guide means threadably receiving said electrode therein;

means for drivingly connecting said motor means with said electrode; and means for mounting the combination of said motor means, said connecting means and said electrode for essentially free sliding elevational movement during and throughout machining of said workpiece, the weight of said combination constantly biasing said combination to slide downwardly toward said workpiece and loading the threads of said electrode in one direction against the threads of said guide during and throughout machining of said workpiece.

13. The apparatus of claim 12, wherein said motor means is hydraulically operated.

14. For use with electrical discharge machining apparatus of the type having an electrical power source, a source of dielectric fluid, and a shiftable head upon which a tool may be mounted, a device for producing a threaded hole at a preselected location in said workpiece, comprising:

an electrically conductive, elongate tool having a threadform defined therein;

fluid driven motor means having a rotatable output shaft directly coupled with said tool for rotating said tool, said motor means having a pair of fluid inputs adapted to be coupled with a source of pressurized fluid, said output shaft being rotatable in either of two rotational directions in response to delivery of pressurized fluid respectively to said fluid inputs;

slide means for reciprocally mounting said motor means and said tool for elevational movement together toward and away from said workpiece during and throughout machining of said workpiece, said slide means being biased by gravity to slide toward said workpiece;

support means attached to said head for mounting said slide means on said head; and threaded guide means carried by said support means and threadably receiving said tool therethrough for guiding the advance and retreat of said tool respectively toward and away from said workpiece, said guide means being held in spaced relationship to said workpiece by said support means.

15. The device of claim 14, wherein said slide means includes:

a slide plate, and a pair of spaced apart guide members secured to said support means and having said slide plate slideably mounted thereon.

16. The device of claim 15, including biasing means coupled with slide means for urging said slide means to shift in a direction away from said threaded guide means.

17. The device of claim 16, wherein said biasing means includes a flat spiral spring having one end thereof connected to said slide plate, the other end of said spring being connected to at least one of said guide members.

18. The device of claim 15, wherein said guide members include a pair of upright posts and said slide plate includes a pair of holes therein for receiving said post therethrough.

19. The device of claim 18, wherein said slide means further includes a pair of roller bearings respectively secured within holes in said slide plate for engaging said posts.

20. The device of claim 14, wherein said fluid driven motor means includes a hydraulically-operated motor.

* * * * *